United States Patent
Chen

[19]

[11] Patent Number: 6,155,743
[45] Date of Patent: Dec. 5, 2000

[54] ANCHORING FIXTURE FOR HOLDING A MUSICAL INSTRUMENT

[75] Inventor: Erh-Chiang Chen, Taichung Hsien, Taiwan

[73] Assignee: TAY-E Co., Ltd., Taichung Hsien, Taiwan

[21] Appl. No.: 09/208,016

[22] Filed: Dec. 9, 1998

[51] Int. Cl.⁷ .................................................. F16B 7/10
[52] U.S. Cl. .................................. 403/374.1; 403/374.3; 403/344; 403/109.1; 248/161
[58] Field of Search ................... 403/110, 109.1, 403/104, 374.1, 374.2, 374.3, 344, 379.3; 248/161, 405, 411, 413; 285/27, 325, 420

[56] References Cited

U.S. PATENT DOCUMENTS

| | | | |
|---|---|---|---|
| 2,991,495 | 7/1961 | Blalack | 248/161 |
| 3,606,409 | 9/1971 | Hawkins, Jr. | 248/411 |
| 4,111,575 | 9/1978 | Hoshino | 403/104 |
| 4,185,808 | 1/1980 | Donohoe et al. | 403/344 X |
| 4,373,235 | 2/1983 | Korgaonkar | 403/344 X |
| 4,497,092 | 2/1985 | Hoshino | 403/104 X |
| 4,744,690 | 5/1988 | Hsieh | 248/411 X |
| 5,139,358 | 8/1992 | Kodama et al. | 403/344 X |
| 5,722,627 | 3/1998 | Hoshino | 248/405 |
| 5,738,326 | 4/1998 | Liao | 248/405 |
| 5,927,810 | 7/1999 | Liao | 248/405 X |
| 5,941,653 | 8/1999 | Cipriani | 403/344 |

*Primary Examiner*—Lynne H. Browne
*Assistant Examiner*—John R. Cottingham
*Attorney, Agent, or Firm*—Bacon & Thomas, PLLC

[57] ABSTRACT

An anchoring fixture for a musical instrument comprising a clamp socket with a platform, the platform having a hollow circular piece arranged on its bottom face, a through hole in its center position for communication with the hollow circular piece. A fixed clamping wall and a movable clamping piece are provided on a top face of the platform at its lateral edge. One end of the movable clamping piece is extended to form a protruded connecting rod, which is inserted in an arc groove channel in the fixed clamping wall. In the central portion of the fixed clamping wall and the movable clamping piece, a semi-circular recess is formed respectively, and an enhancing ring piece locates at an enclosed space formed by the semi-circular recesses. The circular piece of the clamp socket collars onto a top end of a central tube in a musical instrument holder, and an adjustable tube of the musical instrument holder penetrates the enhancing ring piece as well as the through hole in the platform to enter the central tube for completing assembly of the fixture.

1 Claim, 6 Drawing Sheets

ANCHORING FIXTURE FOR HOLDING A MUSICAL INSTRUMENT

BACKGROUND OF THE INVENTION

This invention relates to a fixture for holding a musical instrument, more particularly to an improved structure of an anchoring fixture for holding a musical instrument.

A general holder for a musical instrument (As shown in FIG. 1) contains a tripod, wherein a metallic upright central tube is erected, an adjustable tube is sleeve-jointed thereto, and an anchoring fixture is disposed on top of the adjustable tube for anchoring a musical instrument. A protruded strip formed on the surface of the upright central tube is extended along the longitudinal direction to coincide with a groove formed on an inner wall of the adjustable tube for height regulation, and a musical instrument can be kept on top of an adjustable tube in a preset orientation without turning about.

When the adjustable tube is regulated to a desired height, it will be locked by an anchoring fixture, which is an approximate U-shape clamp including two opposite semi-circular grooves combined to form a circle with an opening for collaring onto the adjustable tube. A bolt is used to screw together a pair of tapped holes at opposite ends of a clamp for locking the clamp on the adjustable tube, wherein a bottom rim of the anchoring clamp clings onto the central tube. A U-shape conventional anchoring clamp usually made of a metallic material will resist against an external force, therefore it requires a rather large force to pinch those two ends of the clamp together and screw a bolt into two tapped holes of the clamp. It may not be an easy job for a weak person to complete, and meanwhile, in the case of a loose fixing, the hung musical instrument may descend owing to gravity. In addition, the structure of a conventional anchoring clamp requires a protruded strip and a cooperative groove to avoid turning of the adjusting tube that can not be constrained by a mere anchoring clamp.

SUMMARY OF THE INVENTION

This invention is proposed to mainly provide an improved structure of an anchoring fixture for holding a musical instrument. The improved anchoring fixture is used to collar through an upright central tube of a musical instrument holder or tripod to clench onto an adjustable tube and keep it at a desired height without turning about. As to attain more convenient operation and better fixing efficacy than a conventional anchoring fixture for holding a musical instrument, the embodied skill of this invention is summarized as the following:

An improved structure of an anchoring fixture for holding a musical instrument contains a clamp socket with a platform, wherein a hollow circular piece is disposed at bottom of the platform; a through hole is formed in central portion of the platform to communicate with the circular piece; on top face of the platform, a fixed semilunar clamping wall and a movable semilunar clamping piece are provided; a protruded connecting portion at one end of the movable semilunar clamping piece is inserted in an arc groove channel of the fixed semilunar clamping wall; at center position of the fixed semilunar clamping wall and the movable clamping piece, a semi-circular groove is formed respectively, and a circular space enclosed by those two circular grooves is supplied with an enhancing ring piece, while the other end of the fixed semilunar clamping wall and the movable semilunar clamping piece are locked by a bolt; the assembled circular piece of the clamp socket collars onto the upright central tube at its top end of a musical instrument holder, the adjusting tube passes through the enhancing ring piece and the through hole in the platform to enter the upright central tube, and after the bolt is locked, the adjusting tube will be kept at a desired height without turning about.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
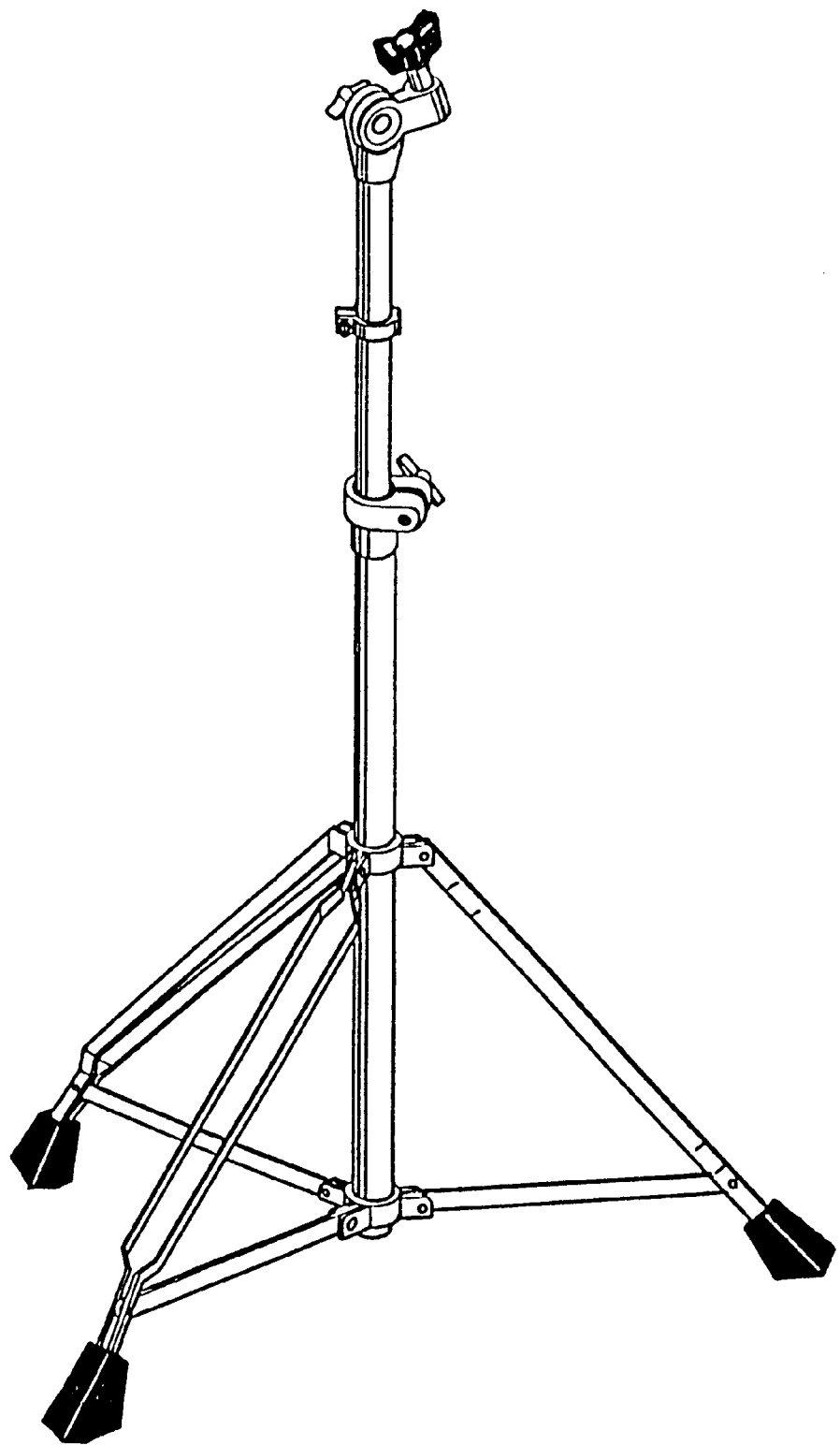
FIG. 1 is a perspective view of a musical instrument holder and its anchoring fixture according to the prior art.
Figure 2:
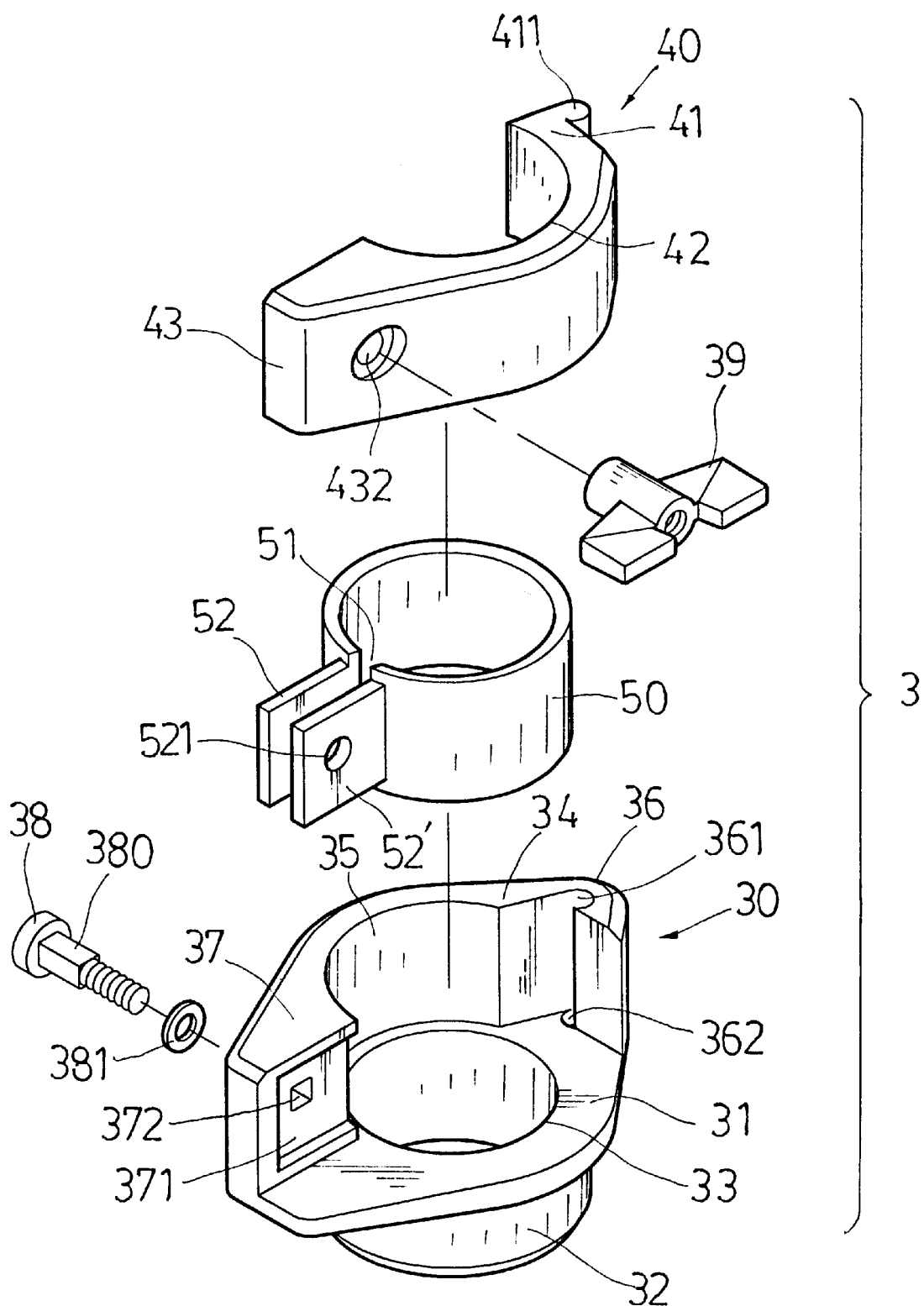
FIG. 2 is an exploded perspective view showing an anchoring fixture of this invention.
Figure 3:
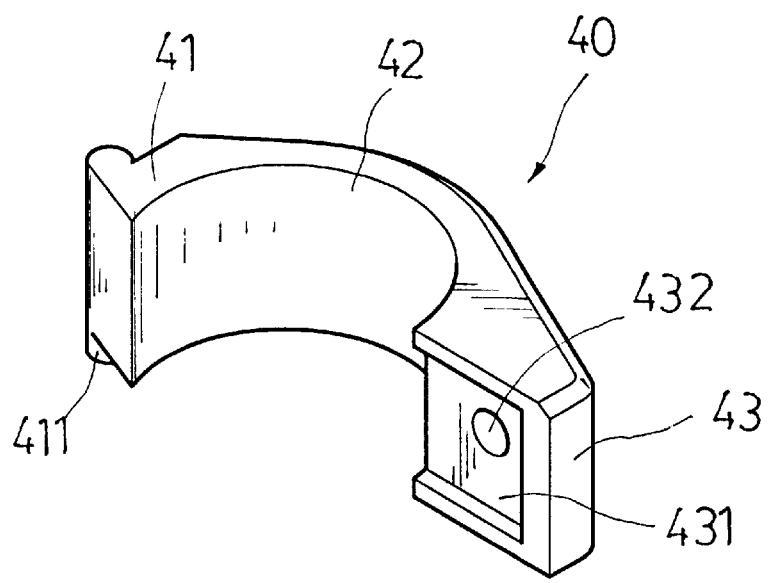
FIG. 3 is a perspective showing a movable semilunar clamping piece of this invention.
Figure 4:
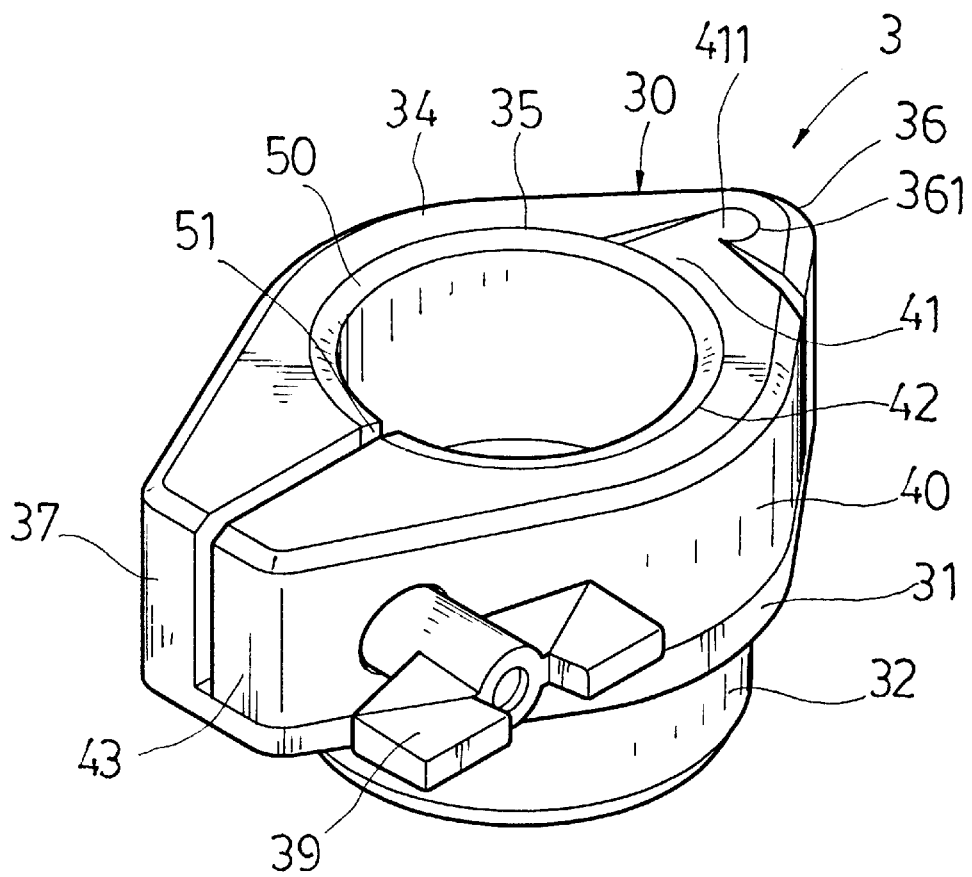
FIG. 4 is a perspective view showing an assembled anchoring fixture of this invention.

As shown in FIG. 2 through FIG. 4, this invention relating to an improved structure of an anchoring fixture for holding a musical instrument, wherein the anchoring fixture 3 contains a clamp socket 30 usually made of a metallic material. An oval platform 31 is provided to the clamp socket 30; and a hollow circular piece 32 is disposed underneath the platform 31 at the center position of its bottom face. A through hole 33 in a diameter corresponding to inner diameter of the circular piece 32 is formed at the center position of the platform 31 for communication with the circular piece 32. On the top face of the platform 31, a semilunar clamping wall 34 is formed along a long lateral edge, and a semi-circular recess 35 is arranged at a position facing the through hole 33. A U-turn connecting end 36 of the clamping wall 34 locates at an end of the platform 31, and a vertical arc groove channel 361 is engraved at the central portion in the wall of the connecting end 36 facing straightly to the through hole 33, also, a positioning hole 362 is arranged on the platform 31 in front of the groove channel 361. A pinch-to-lock end 37 that is offered at another end of the clamping wall 34 locates at the other end of the platform 31. A recess 371 is prepared to a lateral plain face of the pinch-to-lock end 37, wherein an end of the recess 371 facing the through hole 33 is open, and a rectangular channel 372 is provided in a bottom wall of the recess 371 for a rectangular portion 380 of a bolt 38 with a washer 381 to pass through. A connecting end 41 is formed in a movable semilunar clamping piece 40 made of a metallic material, wherein the connecting end 41 is extended outwards to form a vertical connecting rod 411, which is further extended downwards from its bottom end to form a protruded portion. The connecting rod 411 is inserted in the groove channel 361 and the protruded portion enters the positioning hole 362 when the movable clamping piece 40 is positioned on the platform 31 along another long lateral edge. By virtue of cooperation between the connecting rod 411 and the groove channel 361 as well as the positioning hole 362, the movable clamping piece 40 can be opened or closed slightly. Another semi-circular recess 42 is formed in the central portion of the movable clamping piece 40 to combine with the circular recess 35 of the clamping wall 34 to form a circular space. Another pinch-to-lock end 43 is provided at the other end of the movable clamping piece 40, wherein a plain face, a recess 431, and a channel 432 are offered as same as that in the clamping wall 34; the channel 432 is formed in a bottom wall of recess 431 and; accommodates the bolt 38 to pass through; and the bolt 38 is equipped with a butterfly-nut 39. An open ring piece 50 made of plastic material is disposed in the circular space enclosed by the semi-circular recess 35, 42, wherein an outer rim portion of the ring piece 50 locates on the platform 31, its inner rim portion is slightly protruded over the through hole 33. Two side walls of a gap opening 51 in the ring piece 50 are extended outwards in parallel to form two insertion plates 52, 52' that will locate at the recess 371 and 431 respectively when the clamping wall 34 and the movable clamping piece 40 are joined to close. And moreover, each of those two insertion plate 52, 52' is provided with a circular hole 521 for the bolt 38 to penetrate.

Figure 5:
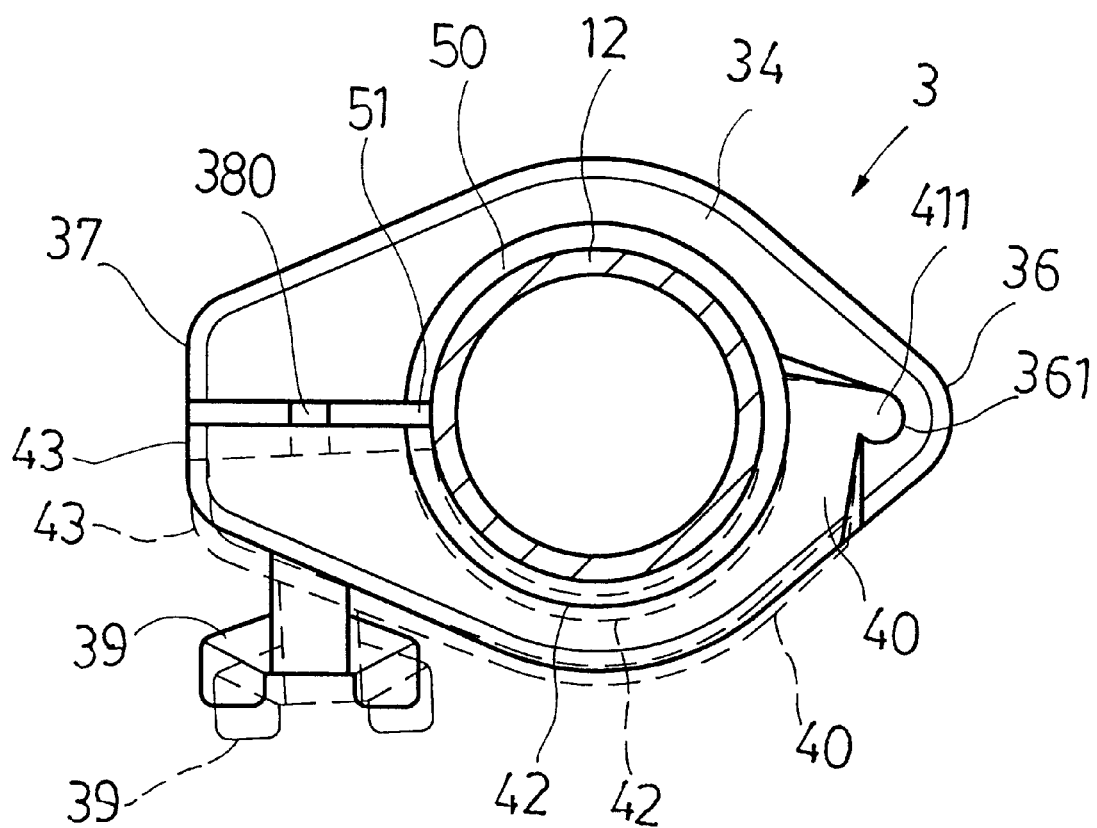
FIG. 5 is a top view of an anchoring fixture of this invention.
Figure 6:
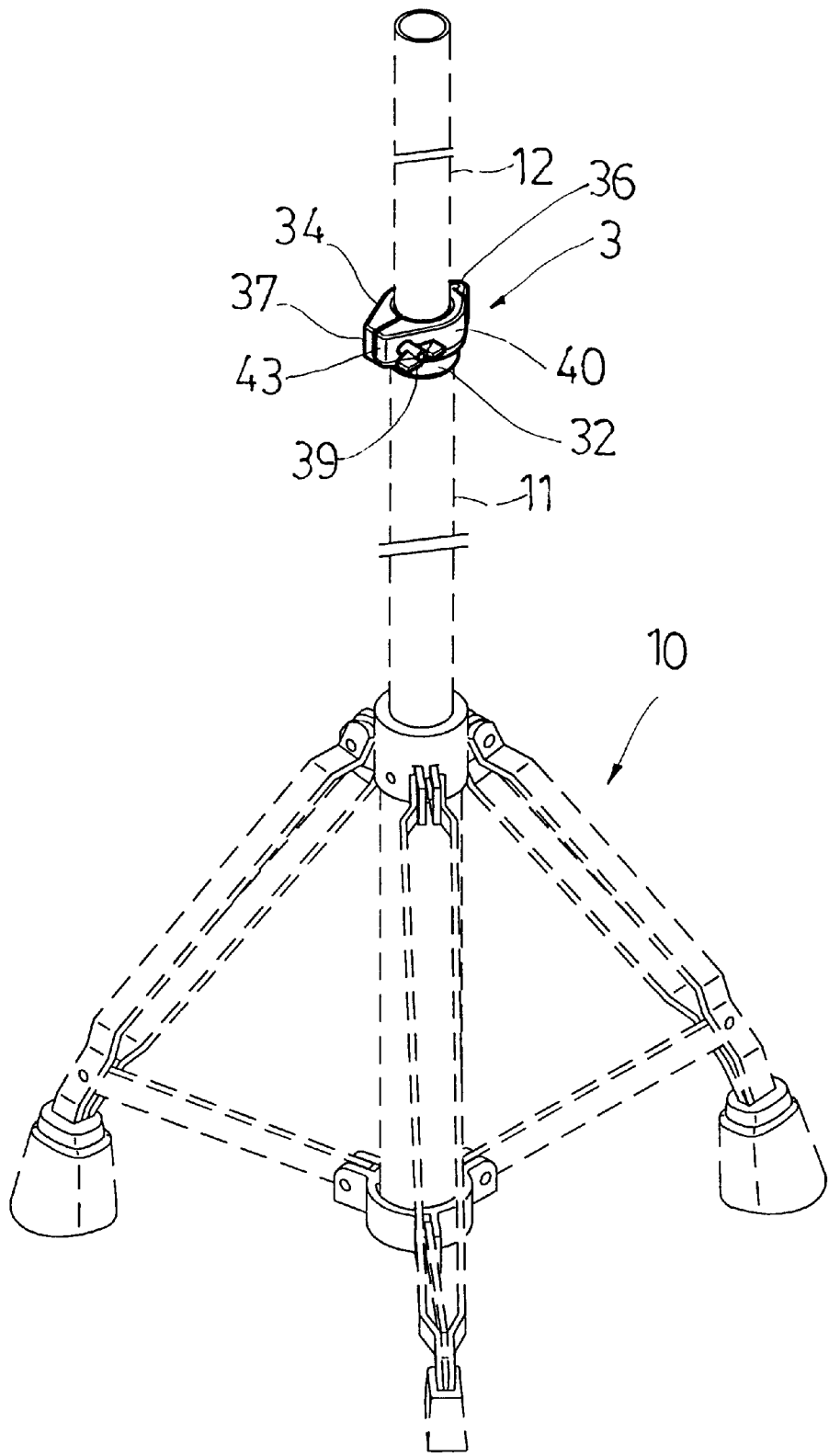
FIG. 6 is a perspective view showing the assembling of an anchoring fixture to a musical instrument holder of this invention.
Figure 7:
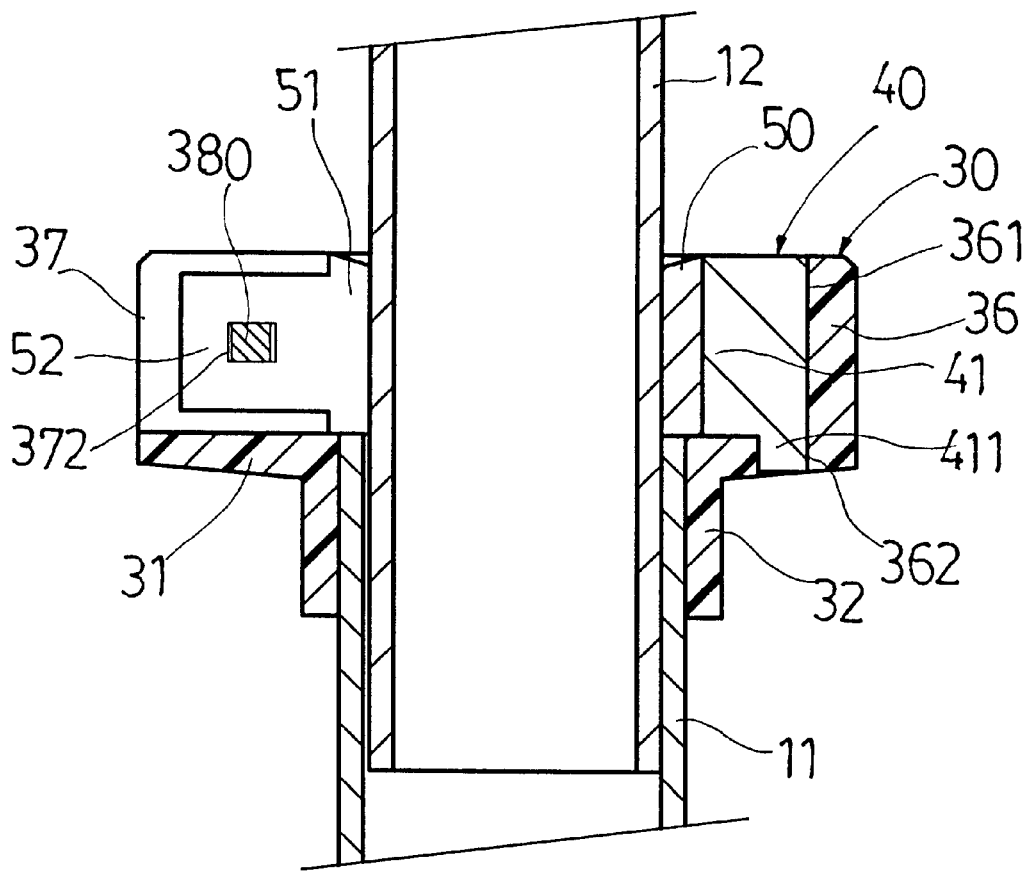
FIG. 7 is a cutaway sectional view of an assembled anchoring fixture and a musical instrument holder of this invention.

As shown in FIG. 5 and 6, according to the above-described structure of this invention, the anchoring fixture 3 is assembled onto a conventional holder for a musical instrument, wherein the holder comprises a tripod 10, a stationary upright central tube 11, and a movable adjusting tube 12 as described above. The circular piece 32 of the clamp socket 30 is applied to collar and cling onto the upright central tube 11 at its top end, and an adjustable tube 12 is guided through the enhancing ring piece 50 between the clamping wall 34 and the slightly opened movable clamping piece 40 and is telescopically received in the upright central tube 11. When a desired height of the adjustable tube 12 is reached, the butterfly-nut 39 is screwed to lock the movable clamping piece 40 to compress on the adjustable tube 12 via the enhancing ring piece 50.

As the circular piece 32 of the anchoring fixture 3 is used to collar tightly onto the top end of the upright central tube 11, unless a considerable external force is exerted, the anchoring fixture 3 can barely be turned, and when the anchoring fixture 3 is locked, the compressed adjustable tube 12 cannot be turned to move even a slight offset, and thereby, a musical instrument set on top of the adjustable tube 12 can be kept at a preset orientation. Further, after the anchoring fixture 3 is set clamping onto the adjustable tube 12, owing to compression of the movable clamping piece 40 and the ring piece 50, the adjustable tube 12 cannot be moved up or down in order to keep it at a constant height. As the clamping portion of the anchoring fixture 3 is constructed by two independent portions—the fixed clamping wall 34 and the movable clamping piece 40, the elastic rebound force in a conventional U-type anchoring fixture 3 is eliminated thoroughly, therefore, it requires only a relatively smaller force to screw the butterfly-nut 39 tightly. Besides, the enhancing ring piece 50 is helpful to the anchoring fixture 3 for pressing hard to the adjustable tube 12 to obtain a positioning efficacy. On the contrary, when releasing the anchoring fixture 3 is desired, all a user has to do is to release slightly the butterfly-nut 39, the adjustable tube 12 can be regulated again.

What is claimed is:

1. An anchoring fixture for maintaining an adjustable tube in a desired position relative to a central tube wherein the adjustable tube is telescopically received within the central tube, the anchoring fixture comprising:

a) a clamp socket including an oval platform having a top face and a bottom face, a hollow circular piece extending from the bottom face, a through hole formed in the platform and communicating with the interior of the circular piece, the interior of the circular piece and the through hole having a common diameter, and a positioning hole formed in the top face;

b) a semilunar fixed clamping wall on the top face, the fixed clamping wall including a first semicircular recess extending around the through hole, a first end having a vertical groove channel facing the through hole and adjacent the positioning hole, and a second end including a first locking recess formed therein and a first bolt hole extending through a bottom wall of the first locking recess;

c) a movable clamping wall including a second semicircular recess, a first end having a vertical rod terminating in a protruded portion, the vertical rod being engagable within the groove channel and the protruded portion being engagable within the positioning hole for permitting pivotal movement of the movable clamping wall relative to the fixed clamping wall, and a second end including a second locking recess and a second bolt hole extending through a bottom wall of the second locking recess;

d) an open ring disposable within an enclosed space defined by the first and second semicircular recesses, the ring including a gap formed by a pair of spaced wall ends, a plate extending outwardly from each wall end and disposed in parallel with each other, each plate having a hole formed therethrough, one plate being receivable within the first locking recess and the other plate being receivable within the second locking recess to dispose the bolt holes of the locking recesses and the holes of the plates in alignment; and e) a bolt extendable through the bolt holes of the locking recesses and holes of the plates for securing the movable clamping member to the fixed clamping member, the ring around the adjustable tube and enclosing the plates of the ring within the first and the second locking recesses.

* * * * *